Feb. 21, 1939.                    C. J. NOREN                    2,147,917
              AUTOMATIC FISHHOOK SETTER AND SHOCK ABSORBER
                    Filed March 31, 1937         2 Sheets-Sheet 2
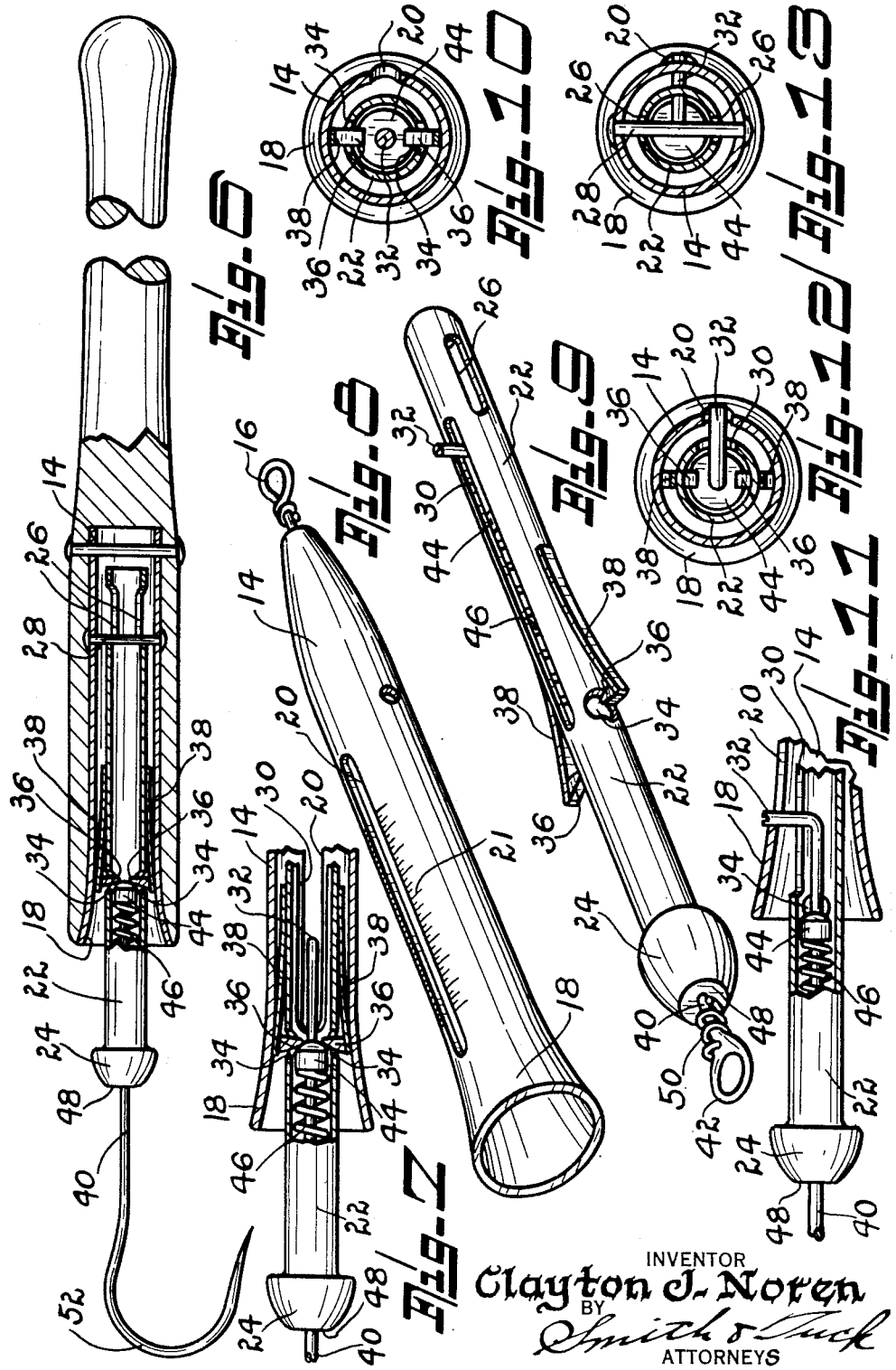
INVENTOR
Clayton J. Noren
BY
Smith & Tuck
ATTORNEYS Patented Feb. 21, 1939

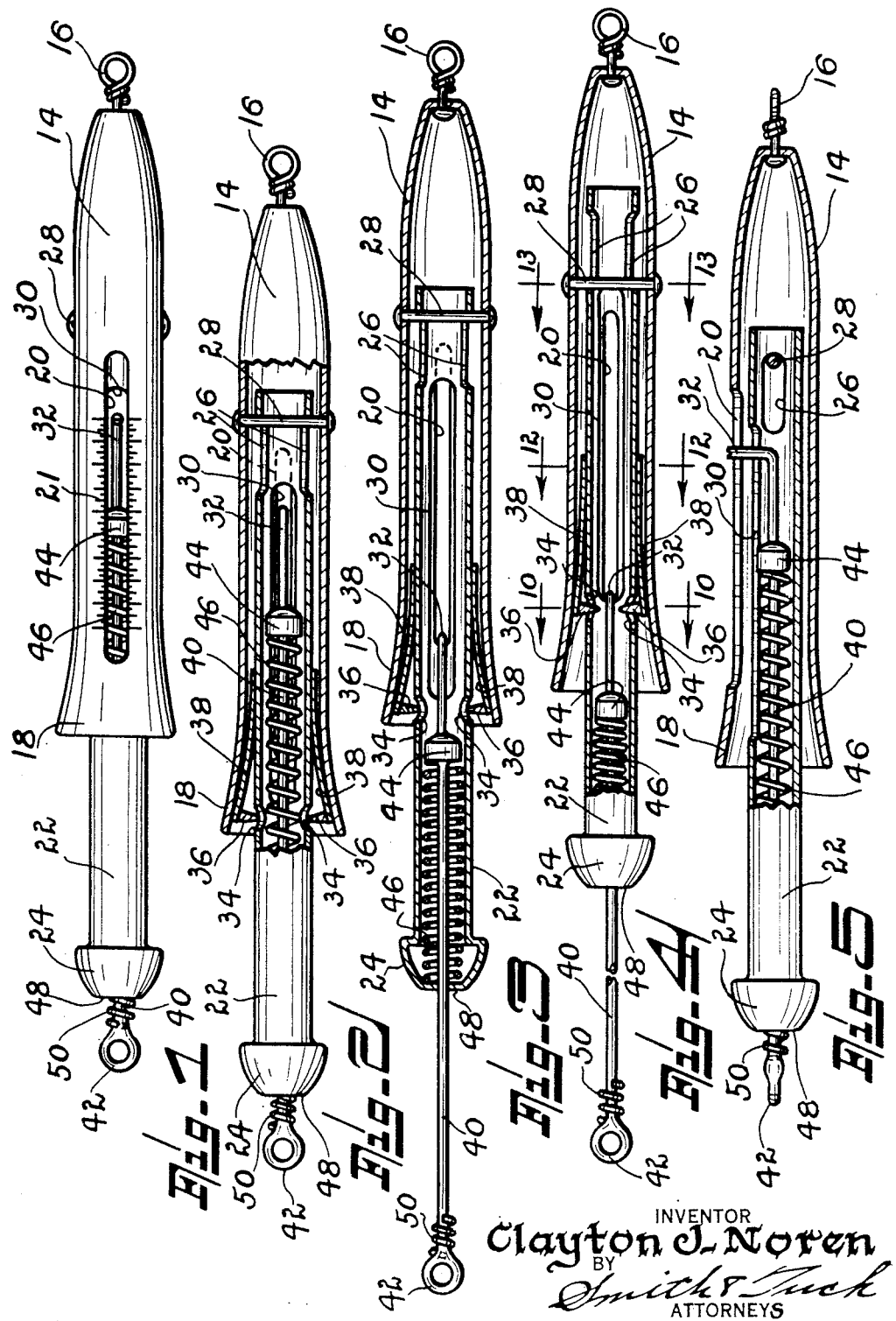

2,147,917

UNITED STATES PATENT OFFICE 2,147,917

AUTOMATIC FISHHOOK SETTER AND SHOCK ABSORBER

Clayton J. Noren, Seattle, Wash.

Application March 31, 1937, Serial No. 134,140

5 Claims. (Cl. 43—15)

My present invention relates to the art of fishing devices and more particularly to an automatic fish hook setter and shock absorber.

In many forms of fishing it is very difficult to impart to the hook, at the time a fish strikes, the quick, but rather light, pull required to set the hook well into the jaw of the fish. This is especially true of trolling, still fishing, surf casting, and the like where relatively long lines are used and, due to tidal conditions or to the movement of the fisherman as in trolling, the resistance of the line causes the same to take the form of a large arc, so that it is indeed difficult to impart a sharp, hook-setting pull to it. In other forms of fishing, particularly commercial, where heavy weighted lines may be used as master lines to which a plurality of hooks are secured, it is of course impossible that the strike of an individual fish be given any particular attention by the fisherman.

The principal object of my present invention is, therefore, to provide a device that will overcome this difficulty.

A still further object of my present device is the provision of spring means within my hook setting device whereby, after a fish has struck and the hook has been set, the fish will be connected to the main line, or possibly to a single line if the device is being used by a sports fisherman, in such a manner that the fish plays against a coil spring and thus cannot put any sharp pull, on the line, that might tend to tear the hook from its set position in the fish's jaw.

Another important object of my present invention is the provision of means whereby my device can be easily set, and further, the provision that when the device is not in its set position it will form a convenient and effective scale, it being found that normally a spring that is of the proper strength to successfully play a fish will also provide a scale by which it can be weighed.

Other and more specific objects will be apparent from the following description taken in connection with the accompanying drawings, wherein Figure 1 is a plan view of my automatic, fish hook setter and shock absorber in its retracted, or released position.

Figure 2 is a view similar to Figure 1 excepting that certain parts are broken away to more fully illustrate the interior construction showing the opposite side of my device from that shown in Figure 1.

Figure 3 is a view taken in the same sense as Figure 2 showing the first step in setting my device.

Figure 4 is taken in the same sense as Figures 2 and 3 but shows my device in its set position with the spring plunger not yet in its forward or working position.

Figure 5 is a view in which the setting plane is revolved 90 degrees from that of Figures 2, 3, and 4.

Figure 6 is a plan view of a gaff hook embodying certain features of my present invention, the same being shown partly in section.

Figure 7 is a fragmentary view illustrating the final movement in setting my device.

Figure 8 is a perspective view of the outer barrel of my device.

Figure 9 is a perspective view showing the inner, or reciprocating, tube of my invention.

Figure 10 is a cross-sectional view along the line 10—10 of Figure 4.

Figure 11 is a fragmentary view showing the step in the cocking of my device just preceding that illustrated in Figure 3, in this view the cutting plane is revolved 90 degrees from that of Figure 3.

Figure 12 is a cross-sectional view taken along the line 12—12 of Figure 4.

Figure 13 is a cross-sectional view taken along the line 13—13 of Figure 4.

Referring to the drawings, throughout which like reference characters indicate like parts, 14 designates the outer housing or barrel of my device. This is provided with a draft link, or swivel 16 at its forward, or pointed, end for attachment to the fishing line. The opposite end is flared as at 18 for purposes which will be more clearly understood when the interior construction is studied. At one point in its periphery the barrel is provided with an elongated slot 20 the edges of which are graduated as at 21 so as to provide the marking of a weighing scale. The general proportions and shape of my housing 14, in its present preferred form, is indicated in Figures 1 to 5, inclusive, and in Figure 8.

Disposed for limited reciprocation within housing 14 is the inner tube 22. This member is substantially tubular as is probably best understood from a study of Figure 9, and is provided at its rearmost end with an enlarged portion 24. The exact shape of this enlargement is normally a matter of individual preference, its principal purpose being to provide a convenient hand grip for use in setting the device. At its forward end tube 22 is provided with diametrically opposed slots 26. These slots are adapted to receive the retaining pin, or rivet, 28 which passes through these slots and is secured within housing 14, after the showing of Figures 2 to 4, inclusive, and Figure 13. Tube 22 is provided, further, with an elongated slot 30 which serves as a guideway for the scale indicator, or index, 32. Disposed slightly rearwardly of the end of slot 30 are, preferably, opposed openings 34 which are adapted to receive the cocking lugs 36. These lugs are spring-supported from tube 22 as by springs 38 which are suitably secured to the tube after the showings of Figures 2, 3, 4, and 9.

Disposed for limited reciprocation within tube 22 is the striker rod 40. This member is provided at one end with the hook line or leader securing eye 42, and at its extreme opposite end by index member 32. Disposed reasonably close to the index end of rod 40 is an enlarged portion 44. This member provides a seat for compression spring 46 and also abuts locking lugs 36 when the device is in its set position. Rod 40 passes, preferably, through spring 46 and through the closed end 48 of tube 22 as is best illustrated in Figure 3, the closed end forming the seat for the rear end of spring 46. In order to provide against deformation of the closed end of tube 22, I have provided a short bumper spring 50.

In a modified construction I have illustrated, in Figure 6, a gaff hook which can be made to incorporate substantially the same mechanism used in my device as described. This arrangement provides a gaff hook in which the hook member 52 operates, in effect, in the same manner as rod 40, so that as the fish is struck with the pointed end of hook 52, it releases the mechanism which then sets the hook, as before, into the fish struck and further, the fish is played against the compression spring 46 as in the former construction.

Method of operation

In using my device, it is normally secured in the line between the fisherman's position and the hook and preferably close to the hook. It is, therefore, quite customary to secure the fishing line into the swivel eye 16 and to secure the fishing leader to eye 42.

To set the device so that it will in turn be in a position to automatically seat the hook when a fish strikes the same, the operator should grasp eye 42 in one hand and enlarged knob 24 in the other, and, in effect, move one hand away from the other after the showing of Figure 3. When this stage of the operation has been reached it will be found that indicator 32 will abut the rear end of slot 20 and the continued movement of setting eye 42 and enlargement 24, will cause rod 40 to move the outer housing 14 rearwardly until the position shown in Figure 4 is obtained. In doing this springs 38 have been compressed forcing the locking lugs 36 into openings 34, in tube 22; this movement is easily effected due to the flaring out of housing 14 at 18. This flaring provides a gradual incline that easily depresses springs 38. The next step in the setting operation, progressing from that shown in Figure 4, is to allow rod 40 to go forward under urgence of spring 46 until the enlarged portion 44 abuts lugs 36, after the showing of Figure 7. Attention is invited in this operation to the fact that slots 26 are of such a length that when tube 22 has been moved forwardly until pin 28 contacts the rear end of the slot, the position of setting is reached where the maximum effort is required to spring the device. It will follow, it is believed, that intermediate positions will have decreased frictional loading and can, therefore, be tripped easier by smaller fish.

It will be observed that the setting of my device requires a compression of spring 46 and as this is only accomplished by, in effect, moving eye 42 away from enlargement 24 it is impossible for a fish, in its struggling, to reset the device.

As soon as a fish hits the hook which is, in turn, secured by a leader or other means to eye 42, its first movement is to carry rearwardly, rod 40, and by virtue of compression spring 46, also tube 22. When this rearward movement has progressed sufficiently far, lugs 36 are retracted, by springs 38, and assume the position as indicated in Figure 3. This action releases rod 40 so that it can be then impelled forwardly with respect to tube 22 by spring 46. Its forward movement being limited only by the proportioning of the spring and rod 40 and the resistance of the fish itself. After the device is sprung in this manner the fish then struggles against spring 46 which serves to dampen any shock that he might otherwise put on either the fishing tackle, itself, or against the hook which, were it solidly connected, might otherwise be torn from the jaw of the fish.

The gaff hook shown in Figure 6 operates substantially in the same manner. Its construction is essentially the same with certain modifications which lend it more economically to this form of use. It serves, however, to seat hook 52 into the fish struck and after the hook has been seated, as in the case of the other equipment, it gives the fish something yieldable to struggle against and this prevents a sudden movement of the fish wresting the gaff from the fisherman's hand.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In an automatic fish-hook setter and shock absorber, the combination with a barrel having an outwardly flared end and a longitudinally extending slot, and a rigid transversely extending pin, of a slidable inner tube having holes therein and slots for co-action with the pin, a pair of springs on the exterior of the tube for co-action with said flared end and retaining lugs on said springs adapted to project through the holes in the tube, a reciprocable, spring-actuated striking rod mounted in the tube and having an end-head movable in the longitudinal slot, and an intermediate head on said rod for co-action with said lugs.

2. In a device as described, the combination with a barrel having a flared end and an inner tube having a limited sliding movement within the barrel and having holes therein, of a pair of spring lugs on the exterior of the tube and adapted to project through the holes in the tube under co-action with said flared end, a reciprocable spring-actuated striking rod mounted in the tube, and a head on said rod for co-action with the spring lugs.

3. In a device as described, the combination with a barrel having a flared end, and an inner tube having a limited sliding movement and having holes therein, of a pair of spring lugs on the exterior of the tube and adapted to project through the holes in the tube under co-action with said flared end, a reciprocable striking rod mounted in the tube and a head thereon for co-action with said lugs, and a spring coiled about the rod and interposed between said head and the closed outer end of the tube.

4. In a device as described, the combination with a barrel and an inner tube having a limited sliding movement therein, of a striking rod mounted in said tube and a head on the rod, a spring interposed between said head and the outer end of the tube, and means mounted on the tube operable under relative sliding movement of the barrel and tube for detaining said head.

5. In a device as described, the combination with a barrel having an outwardly flared end and a longitudinally extending slot, and a transversely extending pin spaced from said end and fixed in the barrel, of a slidable inner tube having an enlarged hand-knob at its outer end and having holes therein, said tube also having a longitudinally extending slot, a striking rod mounted in the tube having one bent end projecting through said longitudinal slot, an eyelet on the other end of the rod and a spring interposed between said eyelet and the hand-knob, an intermediate head on the rod, a spring interposed between said head and the hand-knob, and a pair of spring lugs on the exterior of the tube adapted to project through the holes in the tube and engage said head under co-action with said flared end.

CLAYTON J. NOREN.